March 22, 1938.  F. J. HINDERLITER  2,111,627
ROTARY TOOL JOINT
Filed July 15, 1935
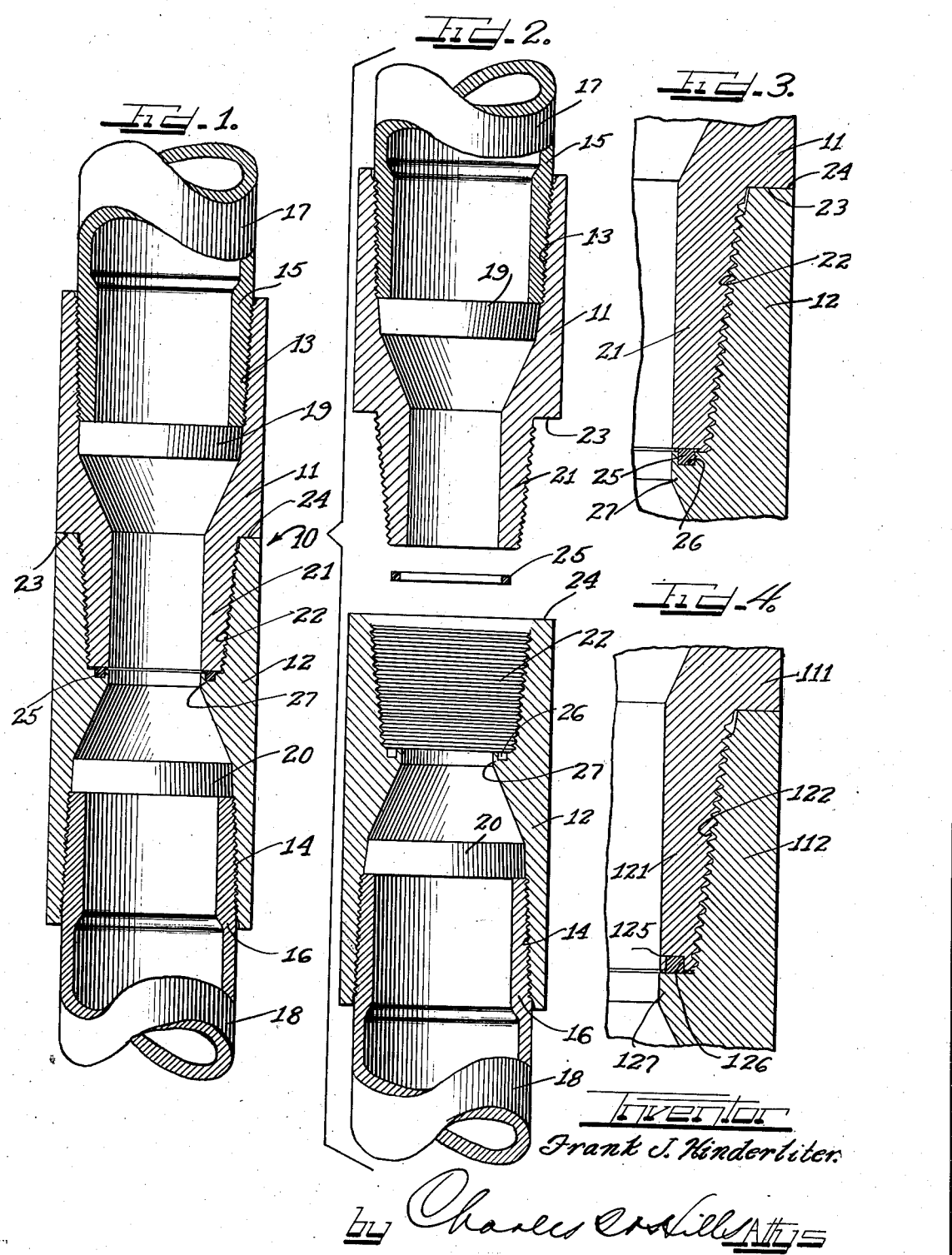
Inventor
Frank J. Hinderliter Patented Mar. 22, 1938

2,111,627

UNITED STATES PATENT OFFICE 2,111,627

ROTARY TOOL JOINT

Frank J. Hinderliter, Tulsa, Okla.

Application July 15, 1935, Serial No. 31,325

2 Claims. (Cl. 285—146)

This invention relates to a rotary tool joint of the same general type as that disclosed in my issued patent, Re. 19,196, granted June 5, 1934.

An object of this invention is to provide a rotary tool joint for use with drill pipe having novelly arranged and supported sealing means between the pin and box members of the joint.

Another object of this invention resides in the provision of a simple and inexpensive mechanical seal for use in a rotary tool joint.

In accordance with the general features of this invention, there is provided a rotary tool joint including box and pin members, the box member having a tapered threaded socket, and the pin member having a tapered threaded shank adapted to be inserted in the socket; sealing means being disposed in an annular groove in one of the members at the inner end of the socket which is adapted to be pressed tightly into sealing position by the screwing of the pin member into the box member.

In accordance with the embodiments of the invention selected for illustration herein, I have provided two forms of the invention, in one of which the groove for the sealing means is located in the bottom of the socket, and in the other of which the groove is located in the extreme inner end of the pin member.

Other objects and features of this invention will more fully appear from the following detailed description taken in connection with the accompanying drawing, which illustrates several embodiments thereof, and in which:

Figure 1 is a fragmentary sectional view through a tool joint embodying the features of this invention, and illustrating the joint as being connected to a pair of aligned stands of pipe;

Figure 2 is a sectional view similar to Figure 1, and illustrating the box and pin members as being separated, with the rubber sealing means disposed between the members ready to be inserted in the socket of the box member;

Figure 3 is an enlarged sectional view corresponding to a portion of Figure 1, and illustrating in detail one form of my invention; and Figure 4 is a sectional view similar to Figure 3, but illustrating a modification of the invention in which the groove for the sealing means is located in the extreme inner end of the shank of the pin member.

On the drawing:

The reference character 10 designates generally a rotary tool joint which is of the same general character as that disclosed in my aforesaid patent. This tool joint embodies two members, namely, a pin member 11 and a box member 12. Each of these members has at its outer end a threaded socket 13—14 in which an upset end 15—16 of a stand of drill pipe 17—18 is adapted to be screwed. The tool joint serves to connect the pipes together in alignment and to provide a seal between the ends of the pipes.

In the bottom of each of the threaded sockets 13—14 there is disposed a rubber sealing ring 19—20 for sealing cooperation with the upset end 15—16 of the pipe in the socket. This sealing ring and its purpose is fully disclosed in my aforesaid Patent Re. 19,196.

The pin member 11 has a tapered threaded shank 21 adapted to be screwed into a tapered socket 22 in the box member 12. The threaded shank 21 terminates at its upper end in a shoulder 23 which is adapted to engage a shoulder 24 at the outer end of the socket of the box member 12 when the two members are tightly screwed together.

In order to provide a seal between the shank 21 and the socket 22, I propose to dispose between the shank and socket a resilient or rubber sealing ring 25. In one form of the invention, this ring 25 is disposed in a groove 26 formed in a shoulder or flange 27 on the interior of the box member and at the bottom of the socket 22. The rubber ring is adapted to be flexed or inserted into this annular groove 26, which serves as a means for confining and locating the ring. This ring has a square or polygonal cross section, and is of a size larger than the cross-sectional area of the groove 26 so as to project outwardly beyond the groove, as is clearly shown in Figure 3.

In the assembling of the joint, the two members are first screwed onto the upset ends of the two pipes 17—18. Then the threaded shank 21 of the pin member 11 is held in a position ready to be screwed into the socket 22 of the box member. The rubber ring 25 is next disposed in the groove 26 in a position to be engaged by the lower end of the pin member 11 as the threaded shank is screwed into the socket 22. The threaded shank 21 is screwed downwardly into the socket 22 until the shoulders 23 and 24 are tightly engaged, at which time the rubber ring 25 is pressed into tight sealing engagement with both the lower end of the pin and the side walls of the groove 26. Due to the fact that the ring 25 projects outwardly beyond the groove 26, the portion of the ring above the groove is displaced laterally so as to embrace tightly the lower end of the threaded shank 21 of the pin. The resiliency of the rubber ring, of course, causes it to yield to and fro with any play which may exist between the members, so that the ring can compensate for such play and still maintain an effective seal between the pin and box members. The purpose of this seal is fully discussed in my previously issued Patent Re. 19,196, and is in general to preclude mud-laden fluid from seeping out of the joint between the threaded portions of the pin and box members.

In Figure 4, a modification of the invention is illustrated in which the pin member 111 has a tapered threaded shank 121 adapted to be screwed into a tapered threaded socket 122 in the box member 112. The box member 112 has an inwardly disposed flange or shoulder 127 adapted to be engaged tightly by a rubber sealing ring 125 disposed in a groove 126 formed in the extreme inner end of the shank 121. This rubber ring 125, like the ring 25, is of a larger cross-sectional shape than that of the groove 126, so that a portion of this ring will project downwardly for tight sealing engagement with the top of the shoulder 127. The operation of this form of the invention is otherwise the same as that of the previously described one.

Now, I desire it understood that while I have illustrated and described in detail several forms of the invention, the invention is not to be thus limited, but only insofar as defined by the scope and spirit of the appended claims.

I claim as my invention:

1. A rotary tool joint including a box member having a threaded socket, a pin member having a threaded shank adapted to be screwed into said socket, said socket having its bottom defined by a shoulder located adjacent the inner end of said shank, and sealing means between said shoulder and said end of the shank comprising a ring of resilient material disposed in an annular groove in one of said members, said ring having a portion projecting from said groove, said projecting portion being adapted to be displaced laterally into sealing position by the screwing of said pin member into said box member between the edges of the groove and the surface of the member opposite and facing said groove, said sealing means in its sealing position having a substantially T-shape cross-sectional configuration.

2. A rotary tool joint including a box member having a threaded socket, a pin member having a threaded shank adapted to be screwed into said socket, said socket member and said pin member having complementary laterally extending abutting surfaces, and sealing means between said abutting surfaces comprising a ring of resilient material disposed in an annular groove in one of said members, said ring having a portion projecting from said groove, said projecting portion being adapted to be displaced laterally into sealing position by the screwing of said pin member into said box member between the edges of the groove and said surfaces of the member opposite and facing said groove, said sealing means in its sealing position having a substantially T-shaped cross-sectional configuration.

FRANK J. HINDERLITER.